JOSEPH R. JORDAN AND JAMES CAMPBELL, OF WEST ALEXANDRIA, OHIO.

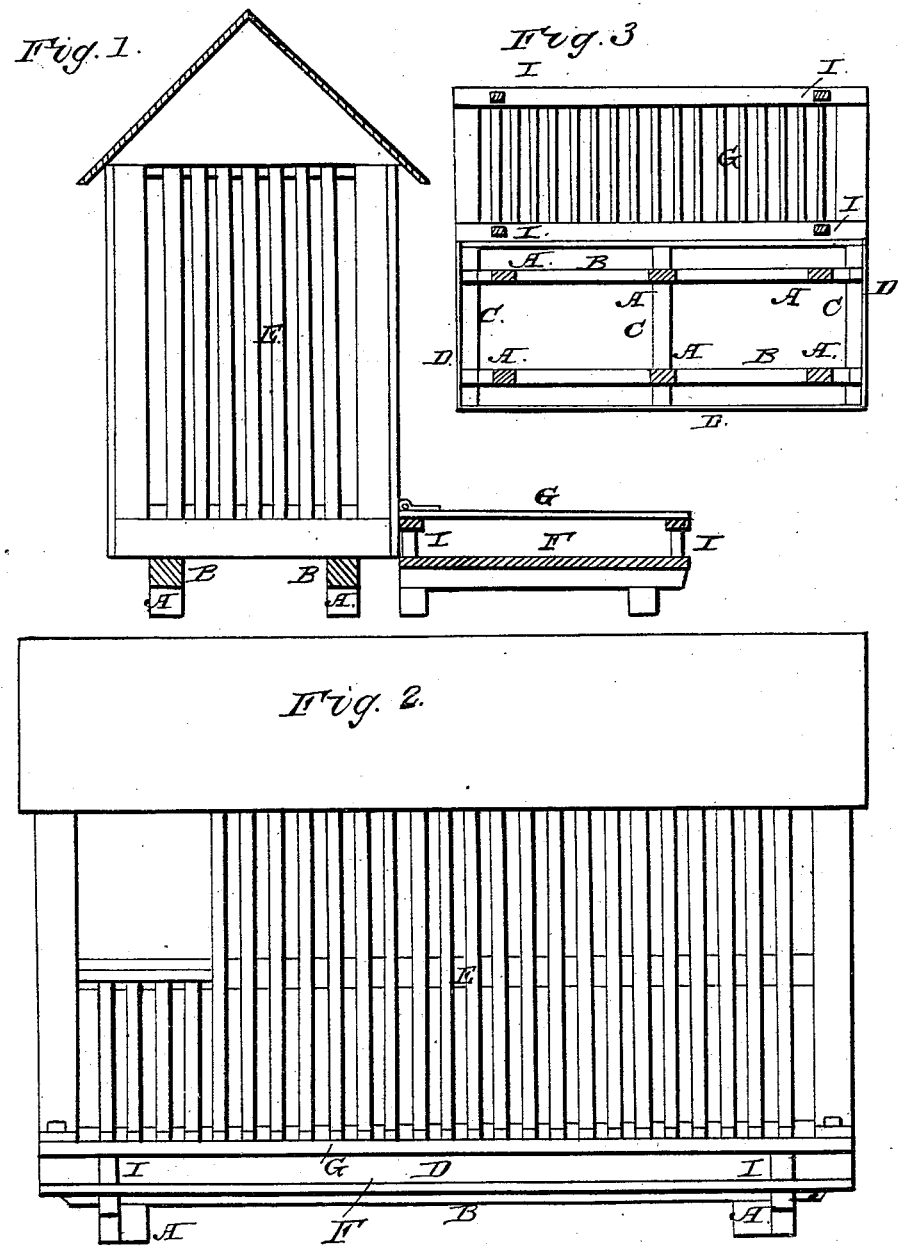

*Letters Patent No. 85,011, dated December 15, 1868.*

IMPROVEMENT IN COMBINED CORN-CRIB AND THRESHING-FLOOR.

The Schedule referred to in these Letters Patent and making part of the same.

*To all whom it may concern:*

Be it known that we, JOSEPH R. JORDAN and JAMES CAMPBELL, of West Alexandria, in the county of Preble, and in the State of Ohio, have invented certain new and useful Improvements in Corn-Crib and Threshing-Floor Attachment; and do hereby declare that the following is a full, clear, and exact description thereof, reference being had to the accompanying drawings, and to the letters of reference marked thereon.

Our invention consists in the arrangement of a hinged door and stationary base, to be used for threshing the corn from the cob, and applied to a corn-crib, as hereinafter described.

In order to enable others skilled in the art to make and use our invention, we will now proceed to describe its construction and operation, referring to the annexed drawings, which form a part of this specification, and in which—

Figure 1 is an end view of the corn-crib, with threshing-floor attached.

Figure 2 is a side view, and

Figure 3, a bottom view of the same.

A A represent stone or wooden pillars, of suitable height and dimensions, on which the sills B B are laid.

These sills are of any desired width, so that the cross-joists C C can be let into them their width.

The joists extend beyond the sills a suitable distance, and the base-boards D D are fixed on their ends, leaving a recess between the base-board and the sills, as shown in fig. 3.

The pillars A A are not to be placed at the corners, but at a suitable distance from them, and it will thus be seen that the rats cannot reach the base-board or any other part of the enclosure, where they can have any foothold while gnawing.

On the groundwork thus described, the corn-crib E is placed, which crib is made in any of the known and usual ways, so as to correspond with the size of the groundwork.

The threshing-floor consists of one solid floor, F, which is stationary, and reaches up to about the lower edge of the base-board D.

The other part is an open floor, G, which is constructed of slats, suitable distance apart, or their equivalents, as shown in fig. 3. This open floor, which is provided with legs, I I, to rest on the solid floor F, is hinged at the lower edge of the crib in such a manner that it can be easily taken off or put on, raised or lowered, as may be desired.

If the corn is tramped, or threshed with flails, or run through a corn-sheller on the open floor G, the corn falls through on to the solid floor, and the cobs remain on the open floor.

Having thus fully described our invention,

What we claim as new, and desire to secure by Letters Patent, is—

The combination of the crib E, grated floor G, and supporting-base F, all arranged and used as specified.

In testimony that we claim the foregoing, we have hereunto set our hands, this 6th day of July, 1868.

JOS. R. JORDAN.
JAMES CAMPBELL.

Witnesses:
JOHN V. CAMPBELL,
LEVI BLACKFORD.